United States Patent

[11] 3,560,010

| [72] | Inventor | George Hohwart<br>Farmington, Mich. |
|---|---|---|
| [21] | Appl. No. | 797,165 |
| [22] | Filed | Feb. 6, 1969 |
| [45] | Patented | Feb. 2, 1971 |
| [73] | Assignee | N.A. Woodworth Company<br>Ferndale, Mich.<br>a corporation of Michigan |

[54] JAW MOUNTING FOR CHUCKS
6 Claims, 8 Drawing Figs.

| [52] | U.S. Cl. | 279/123 |
|---|---|---|
| [51] | Int. Cl. | B23b 31/10 |
| [50] | Field of Search | 279/123 |

[56] References Cited
UNITED STATES PATENTS

| 435,405 | 9/1890 | Cushman | 279/123 |
|---|---|---|---|
| 2,687,308 | 8/1954 | Highberg | 279/123 |
| 3,199,980 | 8/1965 | Blaettry | 279/123X |

*Primary Examiner*—Andrew R. Juhasz
*Assistant Examiner*—Donald D. Evenson
*Attorney*—Harness, Dickey & Pierce ABSTRACT: A sturdy, compact jaw assembly for work holding chucks and the like having a master jaw and a top jaw thereon, the latter being connected by suitable fastening screws to a T-nut mounted for sliding adjustment in a T-slot provided in the master jaw, and wherein work clamping and holding forces on the face of the top jaw are sustained jointly by a cross-key on and integral with the T-nut and an adjusting screw in the master jaw behind and bearing on the T-nut.

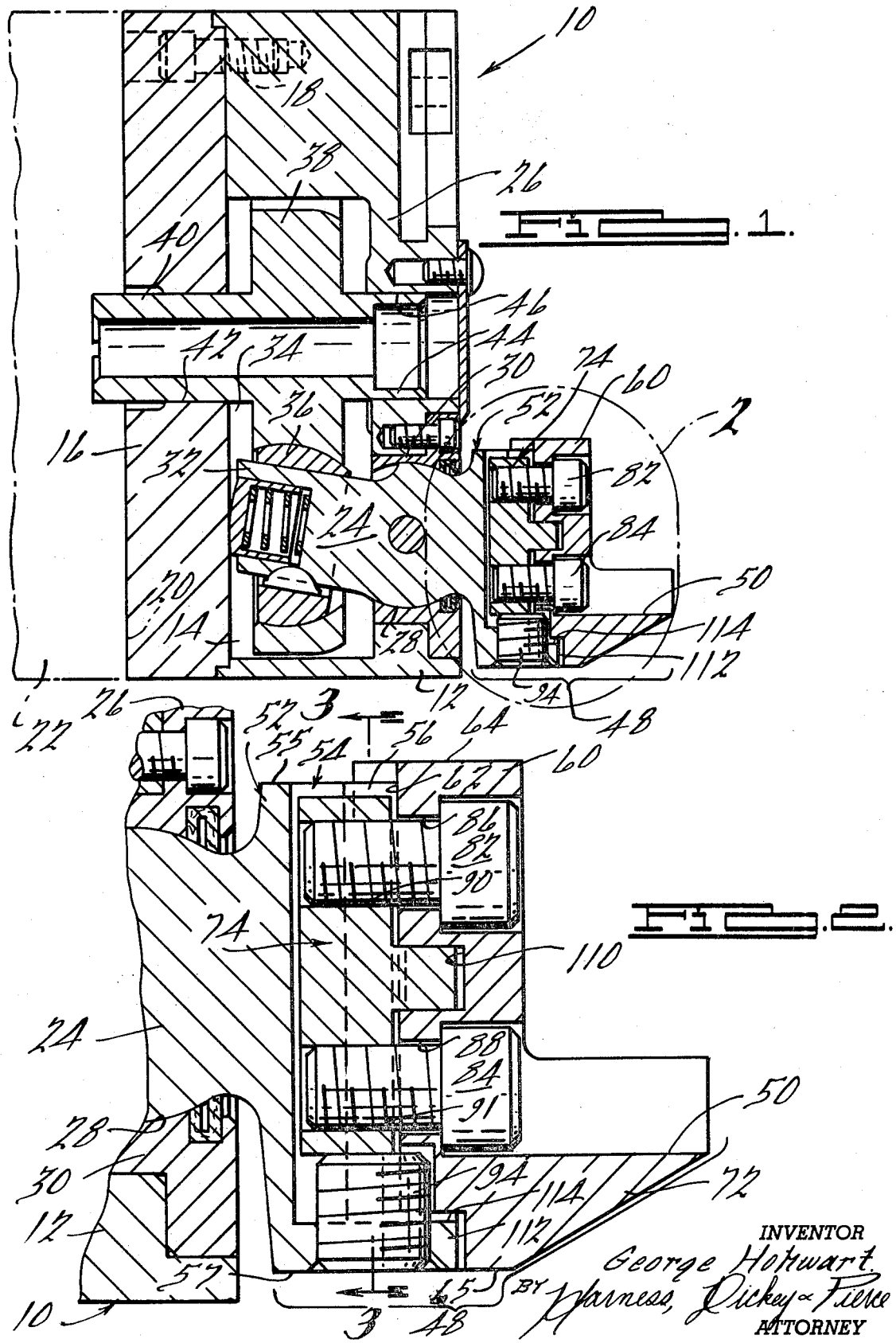

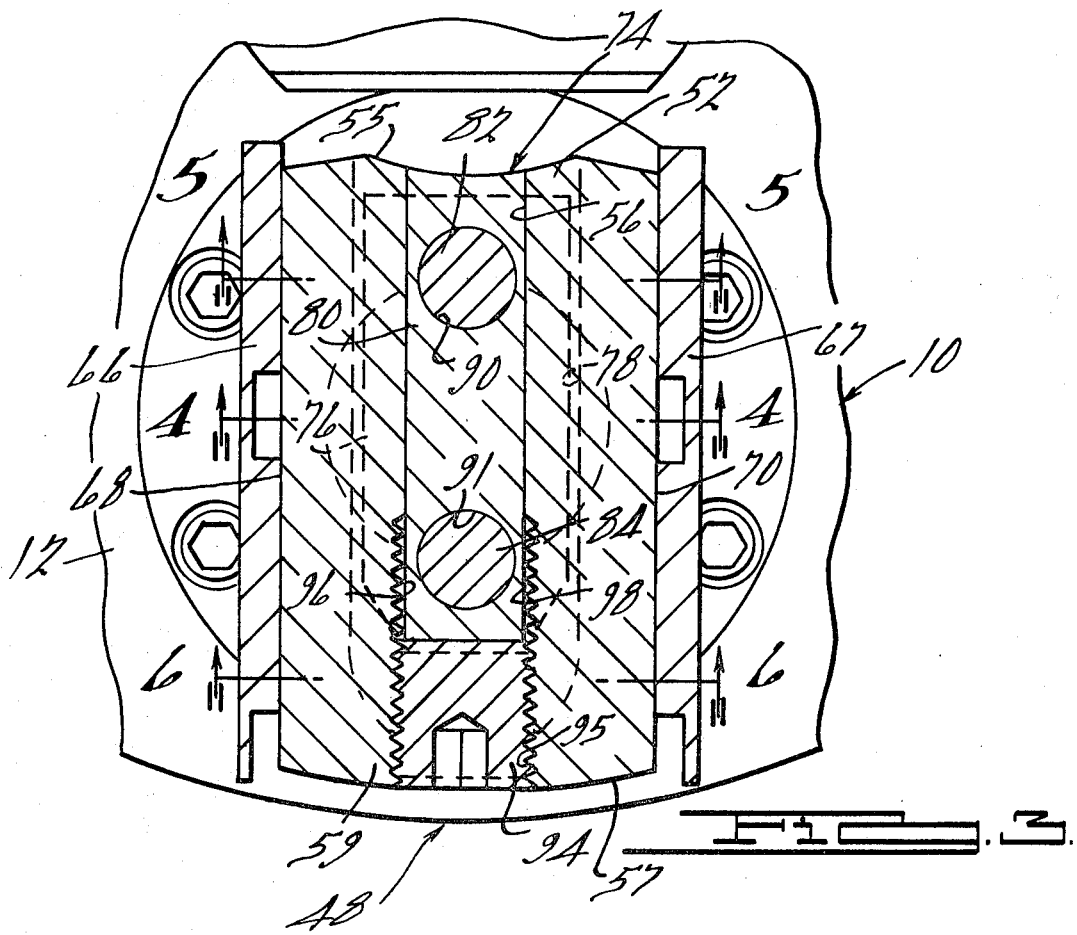
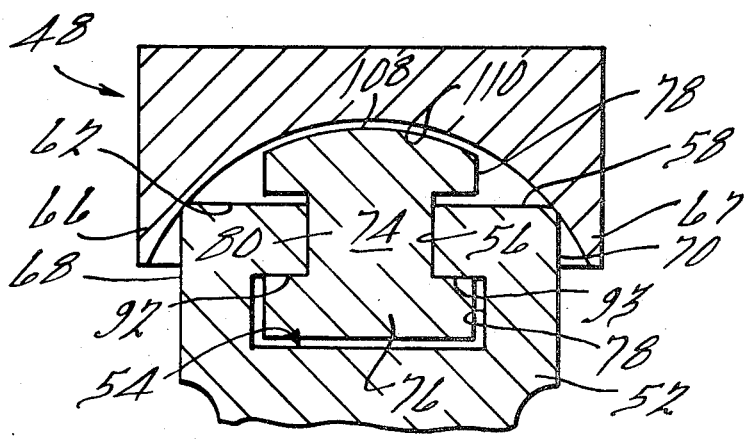

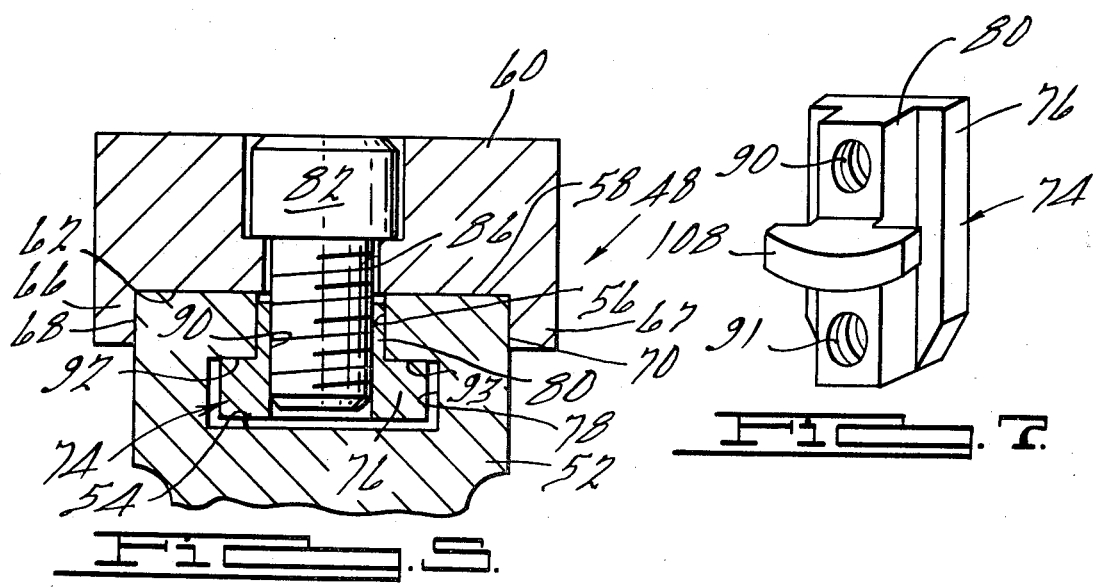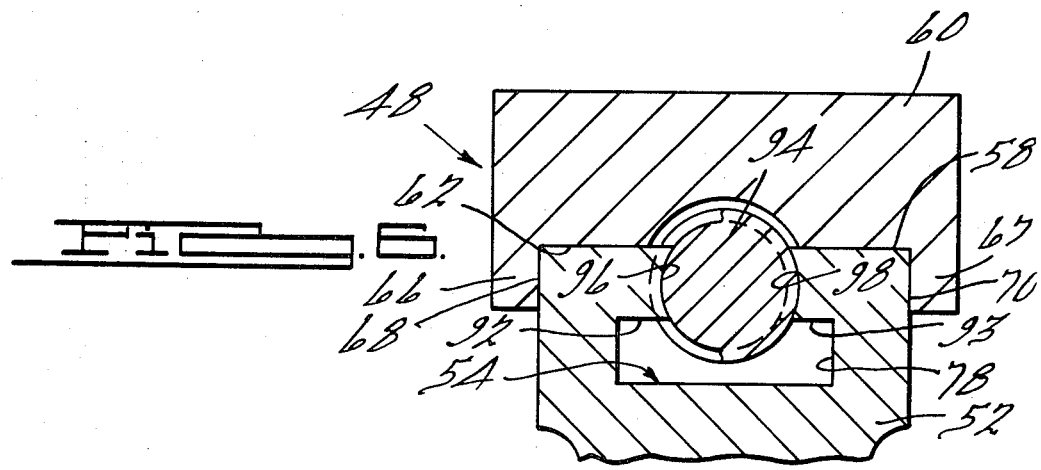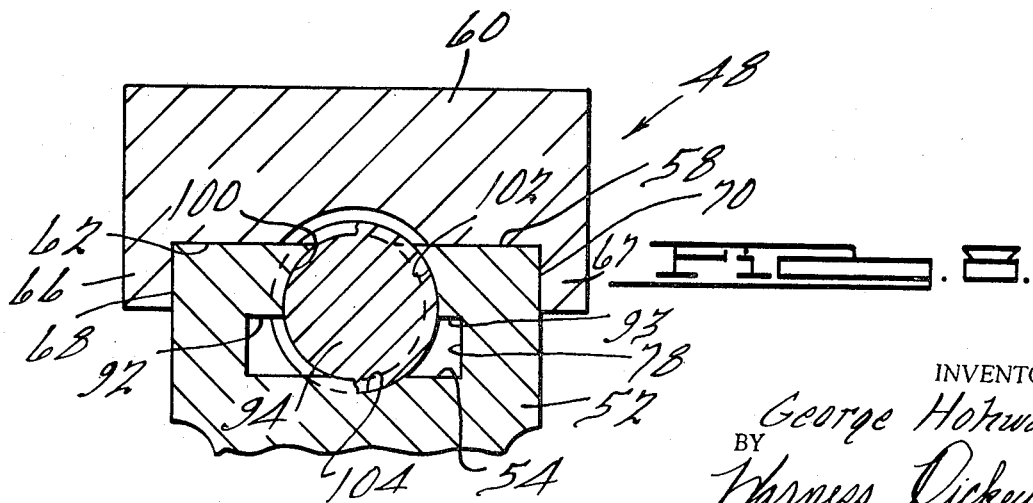

JAW MOUNTING FOR CHUCKS

BACKGROUND OF THE INVENTION

It is desirable in chuck manufacture to maintain the distance between the face of the spindle on which the chuck is to be mounted and the face of the master jaw as short as possible for the reason that runout or other undesirable results of imperfected spindle mounting are magnified and compounded as this dimension increases. Also, the possibility of inaccuracies in machining due to flexure of the chuck or chuck mounting parts increases as the distance between the work and the front spindle bearing increases.

The above considerations have been generally recognized over the years, and the industry has developed standard chuck dimensions which are generally accepted and followed. For example, the standard dimension between the face of the spindle and the face of the master jaw for an 8 inch chuck is 4 11/32 inches. In many types of chucks such as those in which the jaws slide in T-slots in the face plate of the chuck and are actuated by bellcranks or the like and wherein the top or work jaw is fixedly mounted on the master jaw, there is no particular problem. However, the problem of adapting pivoted arm chucks of the type shown in applicant's prior U.S. Pat. No. 3,069,181 or in applicant's later application, Ser. No. 675,894 now U.S. Pat. No. 3,472,526, filed Oct. 17, 1967, for example, to the standard dimension is a different matter particularly if the work holding jaws are made radially adjustable as required by many customers. In the latter type of chuck, a considerable portion of the permissible dimension must be reserved for the chuck body so that the spacing between the front and rear arm pivots is sufficient to assure a leverage factor which is adequate to develop a requisite work holding and clamping force at the jaw faces. The balance of the dimension forwardly of the front arm pivots that can be allocated to the jaw mounting is relatively small. Accordingly, the problem of devising an adjustable jaw mounting that will fit within the available dimensions and that is sufficiently strong to withstand the tremendous pressures to which it is subjected in use is exceedingly difficult. Yet, customer demand requires an adjustable jaw and, for practical commercial reasons, it is desirable to hold the chuck to the standard dimension so that it is interchangeable in the shop with other standard forms of chucks.

SUMMARY OF THE INVENTION

Reduced to its bare essentials, the novel jaw mounting of this invention comprises a master jaw which preferably is formed integrally with the rocker arm of the chuck and has a T-slot in the outer jaw mounting face thereof. A T-nut slidable in the slot has a rib which extends into the narrow portion of the T-slot and has an integrally formed cross-key which projects beyond the face of the master jaw. A work or top jaw seats on the master jaw and is connected to the T-nut by suitable fastening screws and has a cross slot which receives and snugly fits the key. An adjusting screw in the T-slot of the master jaw butts against the T-nut to hold the top jaw in a desired radially adjusted position.

By reason of the above construction and relation of parts, the clamping pressure exerted against the top jaw in use is transmitted to the T-nut through the key and the fastening screws which connect the jaw to the nut. This structure is adequate for the purpose and makes the mounting sufficiently strong and rigid so that excessive pressure is not transmitted to the adjusting screw. Ideally, the adjusting screw should butt directly against the jaw. However, this requires that the rib in the narrow portion of the T-slot be on the jaw rather than on the T-nut and this in turn, reduces the thickness of the T-nut sufficiently so that the connecting screws strip out the threads in the T-nut under clamping pressure. If it were not necessary to hold the overall length of the chuck to such a small dimension many alternative constructions, of course, could be used, but the one described is the only one found so far that fits within the dimensional limitations existent here.

Two forms of adjusting screw mounting can be used. In one form, the adjusting screw engages internally threaded arcuate seats in opposite sides of the narrow portion of the T-slot. This is adequate for most purposes. In the other form, the screw engages threads in the narrow portion of the T-slot and also in the bottom of the T-slot. The latter construction provides added rigidity and support for the adjusting screw and is desirable or even necessary where exceedingly high clamping pressures are developed.

A special feature of the invention is the provision of a bridge and stop across the T-slot at the back of the master jaw. This bridge serves several functions. For example, 1) it greatly strengthens the mounting and prevents the slot from spreading and consequential cracking of the master jaw under clamping pressures, 2) it provides a reference point for the jaw designer and assists the setup man in the initial adjustment of the top jaw, and 3) it serves as a safety stop which prevents the jaw from flying out of the chuck and damaging equipment or injuring personnel if the setup man should forget or neglect to tighten the fastening screws adequately. The top jaw assembly which includes the T-nut is designed to seat solidly against the back stop and, if everything fits perfectly, no adjustment of the jaw is necessary. However, in actual practice, this seldom is the case and some fine adjustment may be necessary at the individual jaws by means of the adjusting screws. Also, the bridge in its capacity as a reference or positioner for the top or work jaw assembly permits different production workpieces to be chucked with the same set of top jaws by placing appropriate spacer blocks or gage blocks between the bridge and the top jaw.

DESCRIPTION OF THE DRAWINGS

FIG. 1 is a diametrical sectional view of a pivot arm chuck of the type referred to above and showing the same equipped with a jaw mounting embodying the present invention;

FIG. 2 is an enlarged view of the portion of FIG. 1 enclosed in the circle 2;

FIG. 3 is a fragmentary, transverse sectional view taken on the line 3—3 of FIG. 2;

FIG. 4 is a cross-sectional view taken transversely through the jaw mounting on the line 4—4 in FIG. 3;

FIG. 5 is a cross-sectional view taken transversely through the jaw mounting on the line 5—5 of FIG. 3;

FIG. 6 is a cross-sectional view taken transversely through the jaw mounting on the line 6—6 of FIG. 3;

FIG. 7 is a perspective view of the T-nut embodying a part of the jaw mounting; and FIG. 8 is a view similar to FIG. 6 but showing a modified form of the invention.

DESCRIPTION OF THE PREFERRED EMBODIMENT

As suggested, the jaw mounting of this invention is primarily adapted and preeminently suited for use on a pivoted arm chuck of the type disclosed in U.S. Pat. No. 3,069,181 or in applicant Ser. No. 675,894 filed Oct. 17, 1967 and both the disclosures of the patent and of the application are incorporated by 12, herein. However, while the jaw mounting is particularly suited for the kind of chuck referred to, it is not necessarily limited thereto and indeed it can be used in any environment where a compact but sturdy mounting for a chuck jaw has utility.

Reference is now had to FIG. 1 which shows a chuck of the type referred to above, and although the chuck is disclosed in detail in the patent and patent application referred to and incorporated by reference herein, a brief description of the chuck is now given. The chuck has a body 10 which consists of a generally cup-shaped housing 12 the interior 14 of which opens rearwardly as shown and a backing plate 16 which closes the housing and is detachably fastened thereto by screws 18. The backing plate 16 is adapted to be mounted on the face 20 of a machine spindle 22, a fragmentary portion of which is shown in the drawing. Different machine tools have different ways of mounting chucks of the type here shown on the spindle 22, and it is contemplated that the backing plate 16 be formed or shaped in any way required to adapt the chuck for mounting on any particular spindle. The usual practice is to interconnect the backing plate and the spindle with interfitting keys or stud adapters and to attach the backing plate to the spindle by fastening screws or cam locks. When attached to the spindle 22, the chuck body 10 of course rotates with the spindle.

A plurality of rocker arms 24 are mounted for pivotal movement in the front or bottom wall 26 of the housing 12. Only one such arm is shown but in practice three arms normally are provided. These arms 24 are disposed adjacent to the periphery of the housing and equidistantly from each other. A detailed description of only one arm 24 is here given but it will be understood that all of the arms are identically constructed, mounted and operated. In the particular form of chuck here shown by way of illustration, the arm 24 is formed intermediate the ends thereof with a spherical enlargement 28 which extends through and is supported for universal rocking movement by a front swivel mounting 30. The portion 32 of the arm 24 extending rearwardly of the swivel mounting 30 within the housing 12 is cylindrical in form and is inclined angularly inwardly as shown. A radial way 34 in the backing plate 16 receives the inner end of the arm portion 32 and guides the same so as to confine pivotal movement of the arm 24 to a path extending radially of the housing 12. A swivel mounting 36 carried by a spider 38 within the housing 10 is mounted for sliding movement on the arm portion 32 and a rearwardly extending hub or guide member 40 of the spider is slidably journaled in a central opening 42 provided in the backing plate 16. As shown, the guide 40 extends through the backing plate 16 and the projecting end thereof is adapted for attachment to a drawbar (not shown) with which machines of the type here under consideration conventionally are equipped. In these machines, the drawbar extends axially through the spindle 22. The forward end of the drawbar is adapted for attachment to a chuck operating part such as the spider 38 and the rearward end of the drawbar is connected to a power actuator such as a hydraulic cylinder or the like which acts to reciprocate the drawbar and the chuck part attached thereto. A forwardly extending guide member 44 on the spider 38 is snugly but slidably recieved in a central opening 46 in the housing 12 to assist in confining the movement of the spider 38 to a direct reciprocatory motion. As more particularly described in the application referred to above, the rear swivel mounting 36 is disposed directly behind and in axial alignment with the front swivel mounting 30 and the inclined rear portion 32 of the rocker arm 24 extends eccentrically through the mounting 36. Thus, reciprocatory travel of the spider 38 causes the rear swivel mounting 36 to slide axially on the rear portion 32 of the rocker arm 24 and as it slides it causes the rocker arm to swivel or pivot in the front mounting 30. When the spider 38 is advanced in the chuck body 10 it slides the swivel mounting 36 forwardly on the rocker arm 24 and causes the inner or rearward end of the rocker arm to move radially inwardly and the outer or forward end thereof to move radially outwardly. The outer end of the rocker arm 24 is adapted to carry a work clamping jaw 48 and advancement of the spider 38 in the body 10 therefor rocks the arm 24 to open the jaw. Conversely, retraction of the spider 38 in the housing 10 causes the rear swivel mounting 36 to slide rearwardly on the rocker arm 24. This in turn forces the rear portion 32 of the rocker arm 24 to move radially outwardly in the body 10 and the forward portion of the rocker arm to swivel radially inwardly to close the jaw 48.

As suggested, this invention is concerned primarily with the particular mounting by which the jaw 48 is attached to the rocker arm 24. Tremendous pressure is exerted in use against the work holding face 50 of the jaw 48 and this force, of course, is transferred directly to the mounting which attaches the jaw to the rocker arm 24. Thus, it is necessary that the mounting be exceedingly strong. However, space limitations imposed on the overall dimension of the chuck requires that the mounting be as short as possible in its axial dimension. The mounting construction here shown and described is satisfactory and is both compact and adequately strong. As in the case of the rocker arms, the jaw mountings are identical and a detailed description of one therefor will suffice.

In connection with the foregoing, it will be observed that the forward end of the rocker arm 24 has an enlarged integral portion forming a master jaw 52 which is radially elongate and generally rectangular in plan. A T-slot 54 in the master jaw 52 extends radially of the body 10. As shown the T-slot 54 extends from and opens through the inner end 55 of the master jaw 52, and, while the T-slot may also extend through the outer end 57 of the master jaw, it preferably terminates short of the outer end leaving the latter closed by an integral wall portion 59, and the latter construction is here shown. The narrow portion 56 of the T-slot 54 opens through the outer jaw supporting surface 58 of the jaw 52.

Mounted on the master jaw 52 is a top jaw 60 which engages and clamps a workpiece in the chuck. The top jaw 60 is formed as required to accommodate a particular workpiece and it is replaceable as different sizes and shapes of jaws may be required to adapt the chuck to different workpieces. The particular jaw 60 here shown by way of illustration is generally rectangular in plan and is wider than the master jaw 52. A groove or way 62 in the bottom of the top jaw 60 extends the full length thereof from the inner end 64 to the outer end 65, and fits over and snugly receives the master jaw 52 with the outer face 58 of the latter seating solidly on the bottom of the way 62. Flanges 66 and 67 defined by the way 62 at opposite sides of the top jaw 60 straddle the master jaw 52 and snugly but slidably receive the sides 68 and 70 of the latter to position the top jaw 60 laterally on the master jaw 52 and to confine and hold the portions of the master jaw on opposite sides of the T-slot 54 so as to prevent these portions from spreading or separating under clamping pressure. An axially outwardly extending portion 72 at the outer end 65 of the top jaw 60 defines the work holding and clamping face 50.

The top jaw 60 is movable longitudinally on the master jaw 52 and adjustable radially of the chuck, but it normally is held securely in a selected adjusted position on the master jaw. To this end, an elongate T-nut 74 is provided in the T-slot 54. This T-nut 74 has a relatively wide portion 76 which fits loosely in the relatively wide inner or bottom portion 78 of the T-slot 54 and a relatively narrow portion 80 which is snugly but slidably received in the narrow portion 56 of the T-slot. Fastening screws 82 and 84 extend through clearance holes 86 and 88 respectively in the top jaw 60 and into internally threaded holes 90 and 91 respectively in the T-nut 74. When the fastening screws 82 and 84 are tightened, they pull the relatively wide portion 76 of the T-nut 74 solidly against the overhanging shoulders 92 and 93 defined by the narrow portion 56 of the T-slot 54 and thus clamp the portions of the master jaw 52 at opposite sides of the narrow portion 56 of the T-slot solidly between the T-nut and the top jaw 60. This clamping action serves to hold the top jaw 60 fixed to the master jaw 52. It will be readily apparent, however, that when the fastening screws 82 and 84 are loosened, the clamped portions of the master jaw 52 are released permitting the top jaw 60 to slide back and forth on the master jaw. In practice the top jaw 60 is initially adjusted on the master jaw 52 to position the work holding face 50 for proper engagement with a particular workpiece and all of the top jaws collectively function to position the workpiece precisely concentric to the rotational axis of the spindle 22. In this latter connection, it may be necessary for the jaw adjustments also to compensate for any slight eccentricity in the mounted position of the chuck body 10 on the spindle 22.

Precise adjustment of the top jaw 60 on the master jaw 52 is achieved by an adjusting screw 94 normally wholly or at least partially supported by the internal threads of a tapped hole 95 provided in the closed outer end 59 of the master jaw and positioned for butting engagement with the outer end of the T- nut 74. In this connection, it will be apparent that when the fastening screws 82 and 84 are loosened, the adjusting screw 94 can be advanced to move the T-nut 74 and the top jaw 60 inwardly on the master jaw 52 and to move the work engaging face 50 of the top jaw closer to the rotational axis of the chuck. Contrariwise, when the adjusting screw 94 is retracted it permits the T-nut 74 and the top jaw 60 to be moved outwardly on the master jaw 52 and the work holding face 50 of the top jaw to move farther away from the rotational axis of the chuck. In practice, the top jaw 60 is positioned with the T-nut 74 butted against the adjusting screw 94. Thus, clamping forces exerted by the workpiece against the work holding face 50 normally must be sustained to some extent by the adjusting screw 94 and the latter, therefor, assists the clamping action of the top jaw 60 and T-nut 74 against the master jaw 52 to hold the top jaw securely in the adjusted position. In this connection, the adjusting screw 94 ideally should butt directly against the top jaw 60 so that work clamping force is transmitted directly from the jaw to the adjusting screw. However, this arrangement is not feasible in a compact mounting of the type required here. The adjusting screw 94 is thus positioned to butt against the T-nut and clamping forces are transmitted thereto through the fastening screws 82 and 84 and T-nut 74.

For most purposes, the adjusting screw 94 can be mounted in the narrow portion 56 of the T-slot 54 as shown in FIG. 6. When this construction is employed, internally threaded arcuate seats 96 and 98 are provided at opposite sides of the narrow portion 56 as inward extensions of the tapped hole 95 and the threads of the seats 96 and 98 are disposed to compliment each other and to fit properly with the external threads of the adjusting screw 94. Manifestly the threaded seats 96 and 98 are required to sustain an increasing proportion of the jaw thrust against the screw 94 as the latter is advanced from the position shown in the drawing in adjusting the top jaw 60 inwardly on the master jaw 52, and in an extreme adjustment they may be required to sustain the entire thrust imposed on the adjusting screw 94.

On the other hand, if greater rigidity and support is desired for the adjusting screw 94, the hole may be positioned lower in the master jaw 52 so as to intersect the bottom of the T-slot 54 as shown in FIG. 8 and in this construction, the latter is formed with three internally threaded arcuate seats 100, 102 and 104 on the opposite sides of the narrow portion 56 and on the bottom of the T-slot as inward extensions of the hole 95.

Regardless of which arrangement or mounting is used for the adjusting screw 94, the hole 95 and the internally threaded arcuate seats 96 and 98 or 100, 102 and 104 preferably are formed initially as a single internally threaded hole. In practice, a hole for the adjusting screw 94 is first drilled in the rearward or outer end 106 of the master jaw 52. This hole is tapped. The T-slot 54 is then milled in the master jaw 52 in precisely centered relation with respect to the previously threaded hole. This leaves the two seats 96 and 98 in the one instance or the three seats 100, 102 and 104 in the other instance disposed precisely with respect to each other to accommodate the adjusting screw 94 and with the internal threads thereof precisely complimentary to each other so that they properly fit and accommodate the external threads of the adjusting screw.

In order to relieve the fastening screws 82 and 84 of excessive strain developed and resulting from work clamping forces of the chuck occurring in use, the T-nut 74 is formed with an integral transverse upper portion 108 which fits in and is snugly received by a transverse slot 110 in the bottom of the top jaw 60. The portion 108 is formed integrally with the narrow portion 80 of the T-nut but it preferably is longer than the narrow portion is wide so as to present a maximum bearing surface to the side of the slot against which it seats. Thus, the portion 108 defines a key and the slot 110 defines a key-way and the two mutually cooperate to interconnect the top jaw 72 and the T-nut 74 mechanically in such a way that clamping forces are sustained to a major extent by the key 108 rather than by the fastening screws 82 and 84. By reason of this construction and arrangement of parts also, the end portions of the key 108 overhang the jaw supporting outer face 58 of the master jaw 52 and the overhanging portions bear on the master jaw and support the T-nut when the fastening screws 82 and 84 are removed.

It will be observed also that the blind or closed outer end 57 of the master jaw 52 is formed with an integral, transverse, upstanding flange 112 which bridges the portions of the master jaw 52 at opposite sides of the T-slot 54. The flange 112 thus strengthens and reinforces the outer end wall 59 and it also cooperates with the depending flanges 67 and 66 on the top jaw 60 in preventing spreading of the T-slot 54 under work holding forces of the chuck developed in use. In addition, the flange 112 cooperates with the end wall 59 in providing a stop for the top jaw 60 and in this capacity, it also serves as a safety device for preventing the top jaw from sliding radially outwardly off of the master jaw 52. This is particularly desirable in a chuck jaw mounting of the type here under consideration as the setup man sometimes fails to tighten the fastening screws 82 and 84 adequately, an oversight that may result in the top jaw 60 being thrown off of the master jaw 52 when the machine is started. Obviously, such an occurrence may result in damage to equipment and severe injury to any personnel struck by the jaw. The flange 112 also serves as an initial locator or positioner for the top jaw 60 as the inner face 114 thereof provides a reference point for the jaw designer in forming and detailing the top jaw. In this latter connection, the master jaw is designed so that the inner face 114 of the flange 112 will be a predetermined distance from the rotational axis of the chuck when the jaw is in a predetermined clamping position. The top jaw 60 can then be designed so that the work engaging face 50 will be spaced precisely a predetermined radial distance from the axis of the chuck in the clamping position of the master jaw. The adjusting screw 94 is then advanced as required for fine adjustment and positioning of the top jaw 60 to assure proper engagement of the latter with a particular workpiece and to eliminate any runout that may exist initially due to slight eccentricity between the axis of the workpiece and the axis of the spindle 22. Also, this arrangement permits adjustment of the top jaw 60 to adapt the chuck to different size workpieces within the adjustment range of the mounting. Various production workpieces can be chucked with the same set of top jaws in this manner by interposing appropriate spacer blocks or gage blocks (not shown) between the flanges 112 of the master jaws 52 and the rearward or outer ends of the top jaws 60. In either arrangement; viz, with the top jaws 60 in the extreme outer position or seated against spacer blocks interposed between them and the flanges 112, the setup man can position the top jaws reasonably accurately in an initial adjustment and the final positioning of the jaws by means of the adjusting screw 94 is thus expedited. If spacer blocks are used to position the top jaw 60, they are of course removed after final positioning of the jaws.

All of the above features in combination mutually cooperate to provide a strong rigid mounting for the top jaw 60 while at the same time maintaining the axial dimension of the jaw mounting to a minimum. The fastening screws 82 and 84 and the adjusting screw 94 mutually cooperate to hold the top jaw 60 securely in its final adjusted position. The flanges 66 and 67 straddle the top jaw 60 to prevent spreading of the T-slot 54 and consequential distortion or even rupture of the master jaw 52 under the tremendous force exerted in use against the work engaging face 50 of the top jaw, and the effectiveness of the flanges in this connection is augmented and reinforced by the integral end wall 59 and the bridging transverse flange 112. At the same time, the end wall 59 and flange 112 provide a positive stop for the top jaw 60 and the flange 112 serves the further function of expediting and facilitating initial positioning of the top jaw 60.

I claim:
1. A jaw assembly for chucks comprising:
   a master jaw having a top jaw mounting and supporting surface and a T-slot therein, said T-slot having a relatively wide slot portion and a relatively narrow slot portion, and said relatively narrow slot portion opening through said jaw mounting and supporting surface;

a T-nut slidably adjustable in said T-slot, said T-nut having a relatively wide portion disposed in the wide portion of said T-slot, a relatively narrow portion disposed in the narrow portion of said T-slot, and an integral cross-key portion extending transversely of said T-slot and projecting above the jaw mounting and supporting surface of said master jaw;

a top jaw surmounting said master jaw and supported on the jaw mounting and supporting surface of the latter, said top jaw having a transverse slot in the underside thereof receiving and snugly fitting the cross-key portion of said T-nut and being adjustable with the latter along said T-slot;

fastening screws interconnecting said top jaw and said T-nut normally holding the same fixed in a selected adjusted position on said master jaw; and an adjusting screw carried by said master jaw in and extending longitudinally of said T-slot behind and butting endwise against said T-nut for selectively positioning the latter and said top jaw on said master jaw.

2. The combination as set forth in claim 1 wherein said adjusting screw is retained by and movable on internally threaded arcuate seats provided on and in line with opposite sides of the relatively narrow portion of said T-slot.

3. The combination as set forth in claim 1 including internally threaded arcuate seats provided at opposite sides of the relatively narrow portion of said T-slot and on the bottom of the relatively wide portion of said T-slot, the internal threads of said seats being complimentary and cooperating with the external threads of said adjusting screw to confine the latter and to permit adjustment thereof longitudinally of said T-slot and to and from said T-nut.

4. The combination as set forth in claim 1 wherein the length of said cross-key portion is greater than the width of the relatively narrow portion of said T-nut and wherein the end portions of said cross-key member project laterally of the relatively narrow portion of said T-nut, the projecting end portions of said cross-key portion extending laterally of said T-slot in overhanging relation to the jaw mounting and supporting surface of said master jaw and presenting an essentially wide bearing face to said top jaw for sustaining work holding and clamping pressures in use.

5. The combination as set forth in claim 1 including integral, longitudinal, depending flanges on said top jaw, said flanges straddling and closely fitting said master jaw on opposite sides of said T-slot and operative to locate said top jaw laterally relatively accurately on said master jaw and to hold the latter to prevent spreading of said T-slot under work holding and clamping pressures developed in use.

6. The combination as set forth in claim 1 including an integral transverse stop member on said master jaw behind said top jaw, said stop member bridging said T-slot and locally interconnecting the portions of said master jaw on opposite sides of said T-slot to prevent spreading of said portions and of said T-slot under work holding and clamping pressures developed in use and also providing a stop for preventing said top jaw from being inadvertently thrown off the master jaw in use, said stop member projecting above the jaw mounting and supporting surface of said master jaw and the projecting portion thereof providing a reference point for initial setting and adjustment of said top jaw.